Feb. 3, 1925.

C. G. WOOD 1,524,771

CLUTCH

Filed Oct. 21, 1922

INVENTOR.
Clarence G. Wood
BY
ATTORNEY.

Patented Feb. 3, 1925.

1,524,771

UNITED STATES PATENT OFFICE.

CLARENCE G. WOOD, OF MUNCIE, INDIANA.

CLUTCH.

Application filed October 21, 1922. Serial No. 596,080.

*To all whom it may concern:*

Be it known that I, CLARENCE G. WOOD, a citizen of the United States, residing at Muncie, in the county of Delaware and State of Indiana, have invented certain new and useful Improvements in Clutches, of which the following is a specification.

The invention relates to clutches, and has for its object to provide, in combination with a disc clutch, a driven disc or plate carried by a shaft, said driven disc being constructed in such a manner, and carried by the shaft in such a manner whereby the plate may move in relation to its shaft for accomodating itself to misalignment of the shaft or inaccuracies in the clutch structure, thereby overcoming a common fault in clutches, especially where used in connection with motors and transmissions of motor driven vehicles.

A further object is to provide a driven plate for clutches, said plate comprising a hub section adapted to be secured on a shaft, and spaced annular sections surrounding the hub section and between which annular sections an annular plate is secured. The annular sections are provided with transversely disposed registering slots for the reception of segmentally shaped members carried by the hub section. The annular plate and members are loosely supported on the segmentally shaped members, thereby allowing the annular member and the annular plate to move independently of the hub section longitudinally for acccommodating the driven plate to misalignment of the driving and driven shafts and to inaccuracies of the clutch structure.

A further object is to stamp the annular members from sheet material and to provide the annular members with transversely disposed slots during the stamping operation, or by milling the slots in the annular members after the stamping operation.

A further object is to proportion the segmentally shaped members in relation to the bottom of the transversely disposed slots of the annular members in such a manner whereby the annular members will be prevented from displacement in relation to the hub section during the assembling of the clutch, thereby allowing the device to be easily and quickly assembled.

With the above and other objects in view the invention resides in the combination and arrangement of parts as hereinafter set forth, shown in the drawings described and claimed, it being understood that changes in the precise embodiment of the invention may be made within the scope of what is claimed without departing from the spirit of the invention.

In the drawings:—

Figure 1:
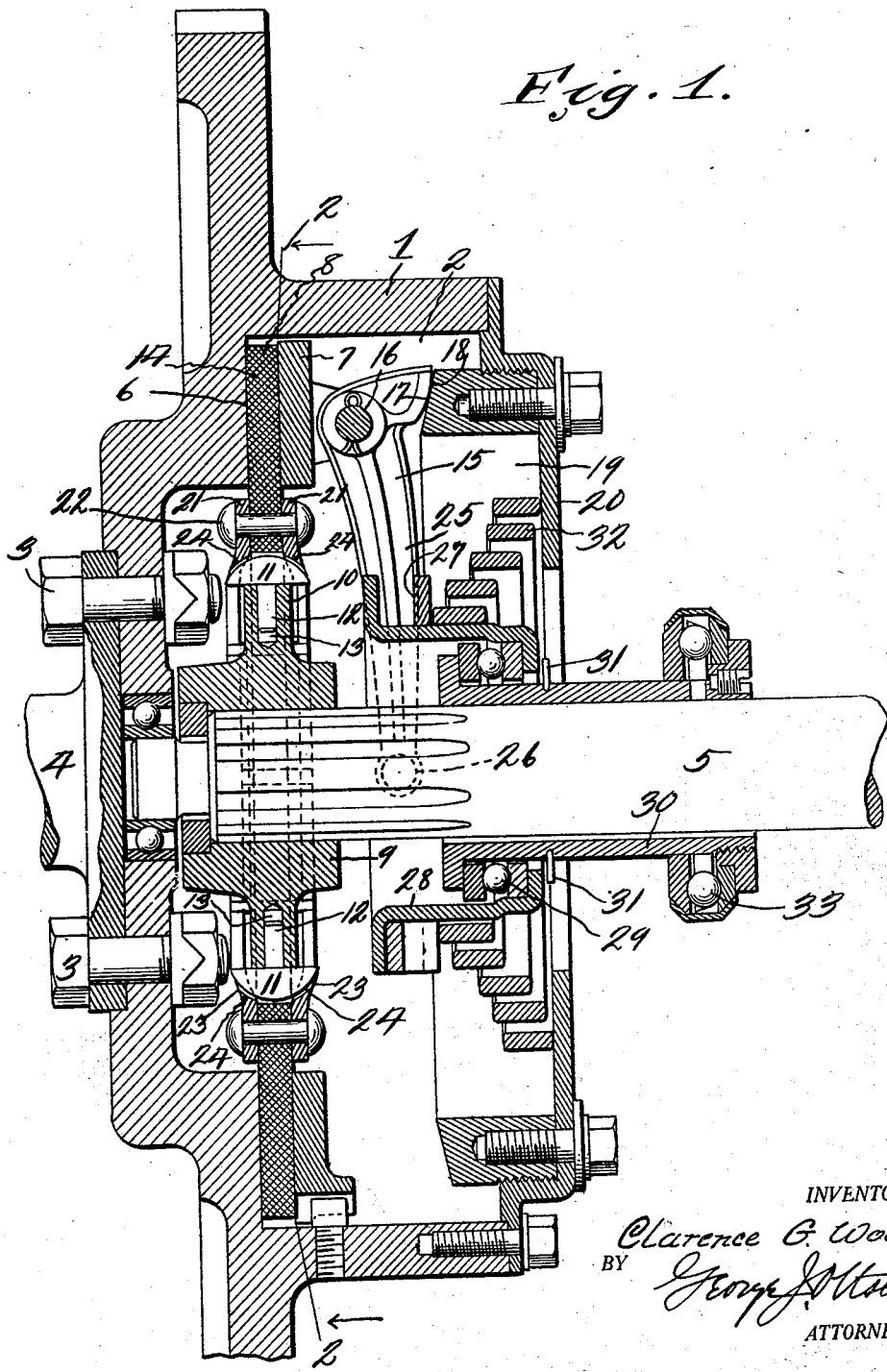
Figure 1 is a vertical longitudinal sectional view through a clutch, showing the driven plate applied thereto.
Figure 2:
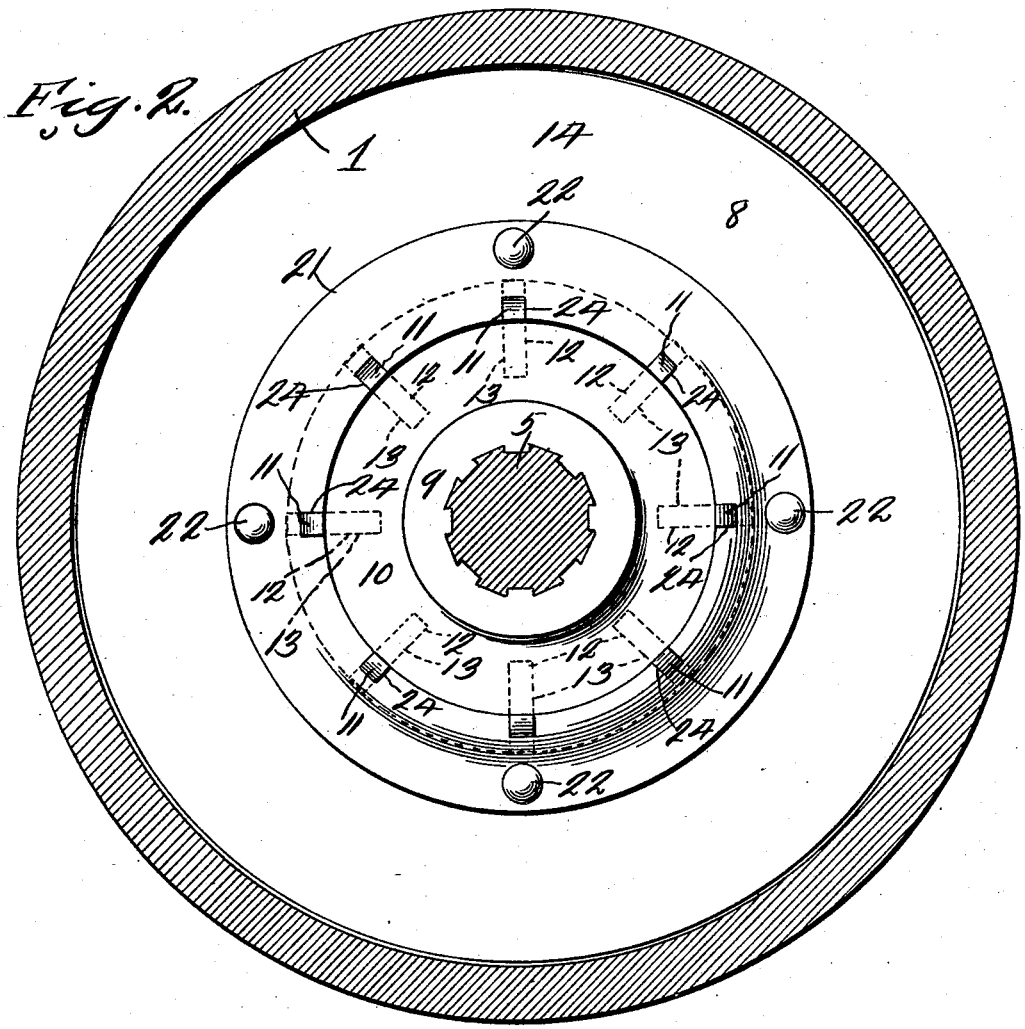
Figure 2 is a vertical transverse sectional view through the clutch taken on line 2—2 of Figure 1.
Figure 3:
Figure 3 is a perspective view of one of the segmentally shaped members.

Referring to the drawings, the numeral 1 designates the clutch casing, and 2 the chamber therein. Secured to the clutch casing 1 by means of bolts 2 is a drive shaft 4, and extending axially into the chamber 2 is a driven shaft 5. It has been found that the drive and driven shafts are often not in alignment, axially, and consequently the driven plate, constructed in the usual manner, does not uniformly bind frictionally against the inner wall 6 when it is forced against said wall by the clamping plate 7. To obviate this difficulty the driven plate 8 is provided. The driven plate 8 comprises a hub section 9 which is splined to the driven shaft 5, which hub section is provided with an annular flange 10. Disposed on the outer periphery of the annular flange 10 are segmentally shaped members 11, which members are provided with stems 12, which are slidably mounted in radially disposed apertures 13 in the flange 10. Surrounding the flange 10 and spaced therefrom is preferably an annular member 14, which is formed from woven asbestos, though it may be formed from metal. The annular member 14 is interposed between the clamping plate 7 and the wall 6 of the clutch casing, and is adapted to be forced into binding and frictional engagement with said wall upon an inward movement of the clamping plate 7, when the clamping levers 15 are rocked on their pivotal points 16 in such a manner whereby their noses 17 cam against the bevelled surface 18 of the adjusting ring 19, which adjusting ring is carried by the cover plate 20 of the clutch casing. The inner edge of the annular plate 14 has secured to its opposite sides rings 21, by means of rivets 22. The rings 21 are similarly shaped and have their inner sides 23 extending inwardly and outwardly, said rings being preferably stamped for cheapness of production and by being similarly shaped may be stamped with the same die, thereby reducing the cost of production to a minimum. The rings 21 at spaced intervals are provided with transversely disposed slots 24, the bottoms of which are arcuate, and the segmentally shaped members 11 extend into said slots and form means whereby during the rotation of the driven shaft 5 and the casing 1 when the clutch is in operation, the driven shaft 5 will rotate with the casing. It will be noted that the radius of the bottoms of the slots 24, and of the segmentally shaped members 11 is less than the distance from the center of the shaft to the bottom of the slots, therefore it will be seen that the annular plate 14 and rings 21 carried thereby will be maintained against displacement on the segmentally shaped members 11 by the engagement of said members 11 with the bottoms of the slots 24. By so constructing the device, it is obvious that the driven plate as a whole may rock slightly in a transverse plane at a right angle to the driven shaft 5 and at the same time the driven plate may be placed on the driven shaft before being placed in the clutch casing, having been previously assembled, and may be easily and quickly placed in the casing 1 without danger of displacement. It has been found that a driven plate constructed in the manner set forth will accommodate itself to misalignment of the shafts 4 and 5 and to variations in the clutch structure incident to manufacture.

Levers 15 have their arms 25 provided with lugs 26, which engage a channel 27 in a clamping lever collar 28. The collar 28 is mounted on an anti-frictional bearing 29, carried by the release sleeve 30 and is held against outward movement by means of the pins 31 carried by the release sleeve. The collar 28 is forced inwardly by means of the coiled spring 32 which is interposed between the collar and the inner wall of the cover plate 20. Release sleeve 30 is controlled in any suitable manner by means of levers cooperating with the thrust bearing 33 carried by the release sleeve.

From the above it will be seen that a driven disc is provided for disc clutches, which disc will accommodate itself to misalignment of shafting and to inaccuracies in the clutch structure, and also one which may be easily and quickly assembled and placed in the clutch casing.

The invention having been set forth what is claimed as new and useful is:—

1. A clutch driven disc comprising a hub section, an annular section surrounding the hub section and spaced therefrom, segmentally shaped members interposed between the hub section and the annular section, said segmentally shaped members being carried by the hub section, spaced rings carried by the annular section and extending inwardly and provided with oppositely disposed slots, said segmentally shaped members being disposed in said oppositely disposed slots.

2. A clutch driven disc comprising a hub section, an annular section surrounding said hub section, segmentally shaped members carried by the hub section, lugs carried by said segmentally shaped members and disposed in radially disposed apertures in the hub section, ring members secured to the opposite sides of the annular section and extending inwardly beyond the inner side thereof and provided with oppositely disposed slots, said segmentally shaped members being disposed in said slots.

3. A clutch driven disc comprising a hub section, a flange carried by said hub section, segmentally shaped members disposed on said flange, lugs carried by said segmentally shaped members and extending into apertures in the flange, an annular member surrounding the segmentally shaped members in the plane of the hub flange, annular members secured to the opposite sides of the first mentioned annular member and extending inwardly and provided with transversely disposed arcuate slots for the reception of the segmentally shaped members, said segmentally shaped members forming means for rotating the first mentioned annular member and cooperating with the bottoms of the slots for limiting the side movement of the first mentioned annular member.

4. A clutch driven plate comprising a hub section, an annular section surrounding the hub section, stamped rings carried by the annular section and extending inwardly towards the hub section and provided with oppositely disposed arcuate slots, segmentally shaped members carried by the hub section and transversely disposed, said segmentally shaped members being disposed in the arcuate slots of the rings and cooperating with said rings for rotating the annular member and for limiting the rocking sideways of the hub section and annular section independent of each other.

In testimony whereof I affix my signature.

CLARENCE G. WOOD.